United States Patent [19]

Roy et al.

[11] Patent Number: 5,770,712
[45] Date of Patent: Jun. 23, 1998

[54] CROSSLINKED HYDROGEL BEADS FROM CHITOSAN

[75] Inventors: Swapan K. Roy, East Brunswick, N.J.; Jason G. Todd, Newport News; Wolfgang G. Glasser, Blacksburg, both of Va.

[73] Assignees: Virginia Tech Intellectual Properties, Inc., Blacksburg, Va.; LigoChem, Inc., North Caldwell, N.J.

[21] Appl. No.: 818,398

[22] Filed: Mar. 14, 1997

[51] Int. Cl.⁶ .......................... C08B 37/08; C08B 37/00
[52] U.S. Cl. .......................... 536/20; 536/124; 435/803
[58] Field of Search ...................... 536/20, 124; 435/803

[56] References Cited

U.S. PATENT DOCUMENTS

| | | | |
|---|---|---|---|
| 4,879,340 | 11/1989 | Moriguchi et al. | 525/54.2 |
| 5,378,472 | 1/1995 | Muzzarelli | 424/445 |
| 5,530,111 | 6/1996 | Glasser et al. | 536/56 |
| 5,599,916 | 2/1997 | Dutkiewicz et al. | 536/20 |
| 5,626,870 | 5/1997 | Monshipouri et al. | 424/450 |

OTHER PUBLICATIONS

Hosokawa et al., Ind. Eng. Chem. Res., 30:788–792 1991 (no month).

*Primary Examiner*—Kathleen K. Fonda
*Attorney, Agent, or Firm*—Whitham, Curtis & Whitham

[57] ABSTRACT

A chitosan support material is made with crosslinking and installation of a spacer arm between the chitosan matrix and an epoxy terminal group at the distal end of the spacer arm. Among other things, the installed spacer arm endows the crosslinked chitosan beads with enhanced binding specificity during chromatographic separations.

30 Claims, 3 Drawing Sheets

FIG.1
PRIOR ART

STEP 1.

CHITOSAN + 1,4-BUTANEDIOL DIGLYCIDYL ETHER

CROSSLINKED CHITOSAN

STEP 2.
DEAE-Cl
NaOH
→

COULD REACT AT THESE −OH GROUPS AS WELL

DEAE-ACTIVATED, CROSSLINKED CHITOSAN

CROSSLINKED HYDROGEL BEADS FROM CHITOSAN

BACKGROUND OF THE INVENTION

1. Field of the Invention

The invention is generally related to the field of hydrogel beads from chitosan.

2. Description of the Related Art

Hydrogel beads are products frequently prepared from polysaccharides, especially agarose, dextran and cellulose. Hydrogel beads from chitosan are also generally known.

Chitosan is the acid-soluble deacetylation product of chitin. For example, chitosan is the product of alkaline hydrolysis of abundant chitin produced in the crab shelling industry. Chitosan, a biopolymer soluble in dilute (i.e., 0.1 to 10%) solutions of carboxylic acids, such as acetic acid, is readily regenerated from solution by neutralization with alkali. In this manner, chitosan has been regenerated and reshaped in the form of films, fibers, and hydrogel beads. For instance, chitosan beads are prepared in one conventional method by precipitating dilute solutions of chitosan in acetic acid into alcoholic or aqueous sodium hydroxide followed by solvent exchange with water.

Because chitosan is easily solubilized and processed, a great deal of research in the hydrogel field has been devoted to experimentation with and/or use of chitosan in a variety of separation and chromatographic environments. However, in contrast to cellulosic beads, which are insoluble in most organic solvents, acids and bases, chitosan retains the solubility in dilute acids of the parent biopolymer. This solubility is typically overcome by inducing crosslinking to form a chitosan matrix or network. Crosslinked gels are three-dimensional polymeric networks swollen by solvent.

Conventional chitosan crosslinking reactions have involved a reaction of chitosan with dialdehydes, such as glutaraldehyde, or diglycidyl ethers, such as alkanediol diglycidyl ethers, or epoxides, such as epichlorohydrin. Chitosan beads crosslinked with ethanediol diglycidyl ethers are commercially available under the trade name CHITOPEARL, as manufactured by Fuji Spinning, Ltd., Japan. After crosslinking, the unmodified amino groups and/or hydroxyl groups on the chitosan beads have been activated to provide a chitosan matrix suitable for bioseparation procedures. This activation has been accomplished with a reagent having functional groups such as carboxyl, trimethylammonium chloride, phenyl, or diethylaminoethyl chloride (DEAE-Cl). Activation occurring through reaction of the hydroxyl groups attached directly to the chitosan backbone is especially relevant to reactions of crosslinked chitosan with DEAE-Cl.

Figure 1:
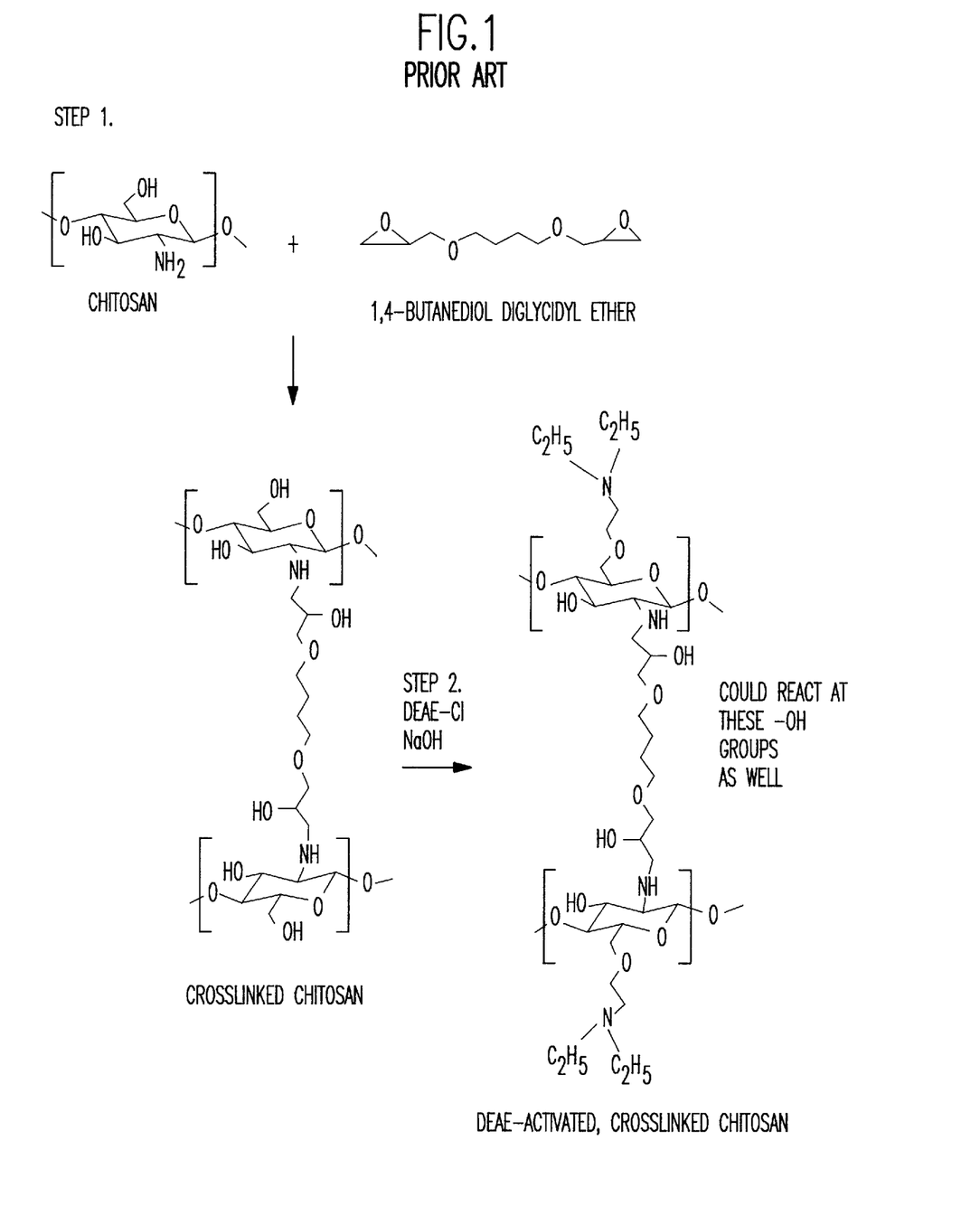
FIG. 1 is a schematic representation of a prior art reaction for crosslinking and functionalizing chitosan to form DEAE-activated, crosslinked chitosan.

A schematic illustration of a conventional reaction pathway for crosslinking chitosan using 1,4-butanediol diglycidyl ether and thereafter providing DEAE-functionalization by reaction with DEAE-Cl is illustrated in FIG. 1. The relative proportions of the chitosan and 1,4-butanediol diglycidyl ether reactants used for this prior crosslinking reaction involved one to two moles of epoxide groups for every one mole of amine groups. Put another way the concentration of the difunctional epoxide in the reaction bath is about 1% to 3% (% v/v) while the concentration of chitosan in the reaction bath is about 1% to 2% (% w/v). Under these conditions, a majority of the terminal epoxide groups of the diglycidyl ether reactant will react with chitosan amine groups. Moreover, the majority of the reacted diglycidyl ether molecules will form crosslinks (i.e., interchain links) by reacting at both ends. It is conceivable that some diglycidyl ether molecules might have been left unreacted at one end. However, even if such free epoxide groups might have existed, they would have been converted to diols by hydrolysis in subsequent treatment with acid (e.g., 0.1 M HCl) or base (e.g., NaOH).

Figure 2:
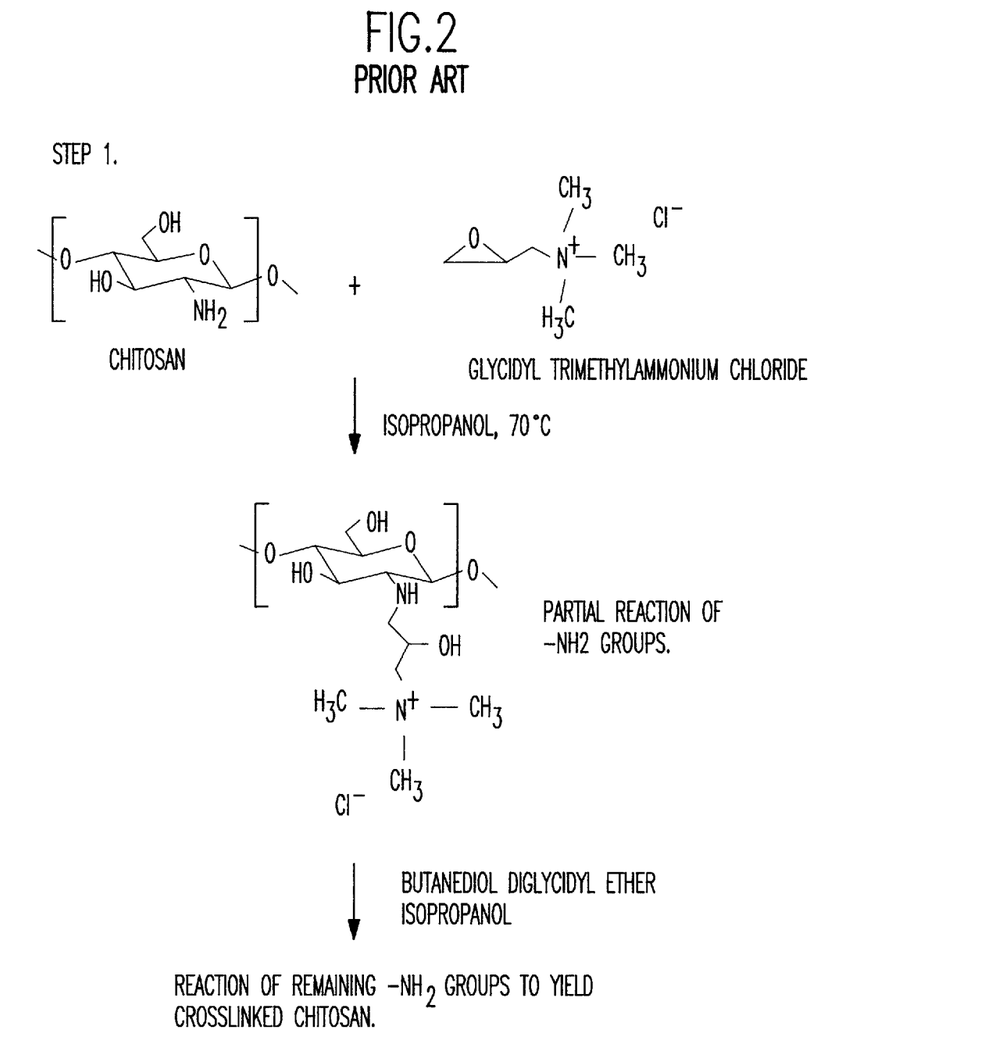
FIG. 2 is a schematic representation of a prior art reaction for preparing crosslinked chitosan hydrogel having directly attached quaternary amine groups.

In a different conventional approach, the chitosan has been quaternized before crosslinking to provide an ion exchange group. The quaternized, crosslinked chitosan is synthesized by first reacting the chitosan with a quaternary amine, such as glycidyl trimethylammonium chloride, and then reacting the quaternized chitosan with an epoxide, such as butanediol diglycidyl ether, to crosslink the chitosan, as illustrated in FIG. 2.

The functionalizations of the chitosan beads by the above-described approaches involve activation of unmodified chitosan amino groups and/or hydroxyl groups that are attached directly to the backbone of the chitosan matrix formed by crosslinking. These types of functionalized beads have then been further modified to tailor them for protein and enzyme immobilization studies. As illustrated in FIG. 1 and FIG. 2, the prior art chitosan exchangers (e.g., DEAE-activated, crosslinked chitosan or quaternized, crosslinked chitosan) have ion exchange groups attached in very close proximity to the chitosan polymer backbone.

In these prior art activation chemistries, the active sorption site (e.g., ion exchange) groups may be attached by reaction with either amine groups or hydroxyl groups attached directly to the chitosan backbone, as well as by reaction with other hydroxyl groups located on the digycidyl ether crosslink chains (FIG. 1). Attachment of active groups may occur in a combination of these locations during the course of a particular activation reaction, leading to variability in solute (e.g., protein) binding affinity and steric accessibility among individual sorption sites. In addition, chitosan amine groups can participate in ionic binding of charged solutes (e.g., proteins) when the solutes approach in close proximity to the chitosan polymer backbone, as would be the case when the above mentioned active sites are attached directly to the chitosan backbone. The above factors may controbute to a loss of specificity of binding and desorption of proteins or other solutes. Thus, while these conventional types of functionalized beads can provide useful binding capacity for these types of solutes, the solutes tend to elute over a very wide range of pH or salt concentrations, which is undesirable for separation operations involving mixtures of solutes.

SUMMARY OF THE INVENTION

It is an object of this invention to provide a method for forming crosslinked chitosan support material have superior binding specificity and protein desorption properties.

Briefly and in general terms, a chitosan support material is made with crosslinking and installation of a spacer arm between the chitosan matrix and an epoxy terminal group at the distal end of the spacer arm. The installed spacer arm endows the crosslinked chitosan beads with enhanced binding specificity during chromatographic separations. The activation reaction involving the epoxy terminal group of the installed spacer arm is highly specific in that active sites (e.g., ion exchange groups) are attached to the matrix only at the end of the spacer arm, and not at other locations on the chitosan support matrix. The installed spacer arm is especially advantageous in the case of binding of macromolecular solutes, such as proteins, which, due to their large size, would otherwise be sterically limited in how close they may approach the chitosan backbone. Placing the active sites (e.g., ion exchange groups) on the end of a spacer arm moves the active sites out of the range of steric interference nearer the chitosan matrix, giving a more uniform accessibility among active sites. In addition, the active sites, when located on the end of a spacer arm, are moved out of the range of ionic interactions with chitosan amine groups. The specificity of location of active sites in combination with the location of these active sites away from the chitosan matrix improves the specificity of binding and desorption.

More specifically, the addition of an active sorption site (ionic or affinity) to the terminus of a distance-creating molecular substituent on the backbone of the chitosan gel material, instead of directly onto the backbone, has the steric effect of creating molecular access for the solute molecules to be separated vis-à-vis the sorption matrix. The invention provides a facile and efficient technique for creation of such superior access by separating the active site from the support material on the nanoscale dimension. By effecting this innovative structural modification to a chitosan molecule contemporaneous with the crosslinking reaction, superior dynamic separations specificity can be achieved in small and large dimension chitosan hydrogel beads.

More particularly, the spacer arm is installed on the chitosan matrix by reacting chitosan amino groups of porous chitosan beads with a large excess, in a stoichiometric (molar) sense, of polyfunctional epoxides having two or more terminal epoxide groups. The polyfunctional epoxide preferably is a difunctional epoxide, although polyfunctional epoxides having three or more terminal epoxides can also be used. The difunctional epoxide preferably has a linear main chain flanked by two terminal epoxide groups.

If too small of an excess (i.e., too low of a concentration) of the polyfunctional epoxide reactant is used during the crosslinking reaction, this ultimately will lead to an inadequate number of free terminal epoxides available for conversion to active sites for practical implementation of the beads. On the other hand, a point of diminishing returns can be expected above which any further increases in the excess amount of the polyfunctional epoxide will not lead to a corresponding increase in free terminal epoxides in the beads. With these considerations in mind, a "large excess" of polyfunctional epoxide used in the reaction to crosslink chitosan generally means a concentration of polyfunctional epoxides in the reaction mixture of about 8% or greater up to a value below 100% (% v./v.), and a preferred practical range of about 8% to 25% (% v./v.), while the concentration of chitosan solids in the reaction mixture is about 1% to about 2% (% w./v.). Put another way, the relative amounts of the chitosan and polyfunctional epoxide reactants used should provide about 5 or more moles of epoxide groups for every one mole of amine groups. In one embodiment, about 10 to about 75 moles of epoxide groups for every one mole of amine groups are provided in the crosslinking reactants. The amount of excess epoxide used also will depend on the particular application at hand. For example, a lower number of active sites would be desirable in affinity chromatography as compared to ion exchange resin applications.

This "large excess" concentration of the polyfunctional epoxide reactant ensures that not all of the polyfunctional epoxides will have all their epoxide terminal groups reacted with chitosan amine groups. That is, a terminal epoxide group of a portion of the polyfunctional epoxides will remain unreacted even though another terminal epoxide group of the same polyfunctional epoxide reactant reacts with a chitosan amino group. In this way, the polyfunctional epoxide molecule creates a spacer arm between the unreacted epoxide group of these polyfunctional epoxide molecules and the chitosan support material. The unreacted epoxy group is available for conversion to various types of bonded phases with appropriate reagents. For instance, the unreacted epoxide group can be reacted to form an amine anion exchange group.

It has been experimentally confirmed that the spacing of the amine anion exchange group from the crosslinked chitosan support via the spacer arm reduces the amount of non-selective binding that occurs during protein separation procedures performed with the inventive chitosan support material. For instance, the inventive crosslinked chitosan with the installed spacer arms makes it possible to efficiently separate IgG from bovine serum albumin (BSA) using large-diameter chitosan beads with weak anion exchange groups remotely attached to the chitosan support via the spacer arms.

Hydrogel beads made by the invention are effective chromatographic support materials, and, as such, can be used for separations in biotechnology (e.g., protein separations) and pharmaceutical applications. For instance, the hydrogel beads of this invention can be used to selectively bind one type of protein at a specific salt concentration and pH relative to other types of proteins and cellular debris with relative ease. The hydrogel beads of the invention are also useful as adsorbents in waste water purification and clean-up, heavy metal concentration and removal, and pesticide complexation.

BRIEF DESCRIPTION OF THE DRAWINGS

The foregoing and other objects, aspects, features, and advantages of the present invention will be better understood from the following detailed description of the preferred embodiments of the invention with reference to the drawings, in which.

DETAILED DESCRIPTION OF THE PREFERRED EMBODIMENTS OF THE INVENTION

A chitosan support material is fabricated with simultaneous crosslinking and installation of a spacer arm between the chitosan matrix and a terminal active site.

Figure 3:
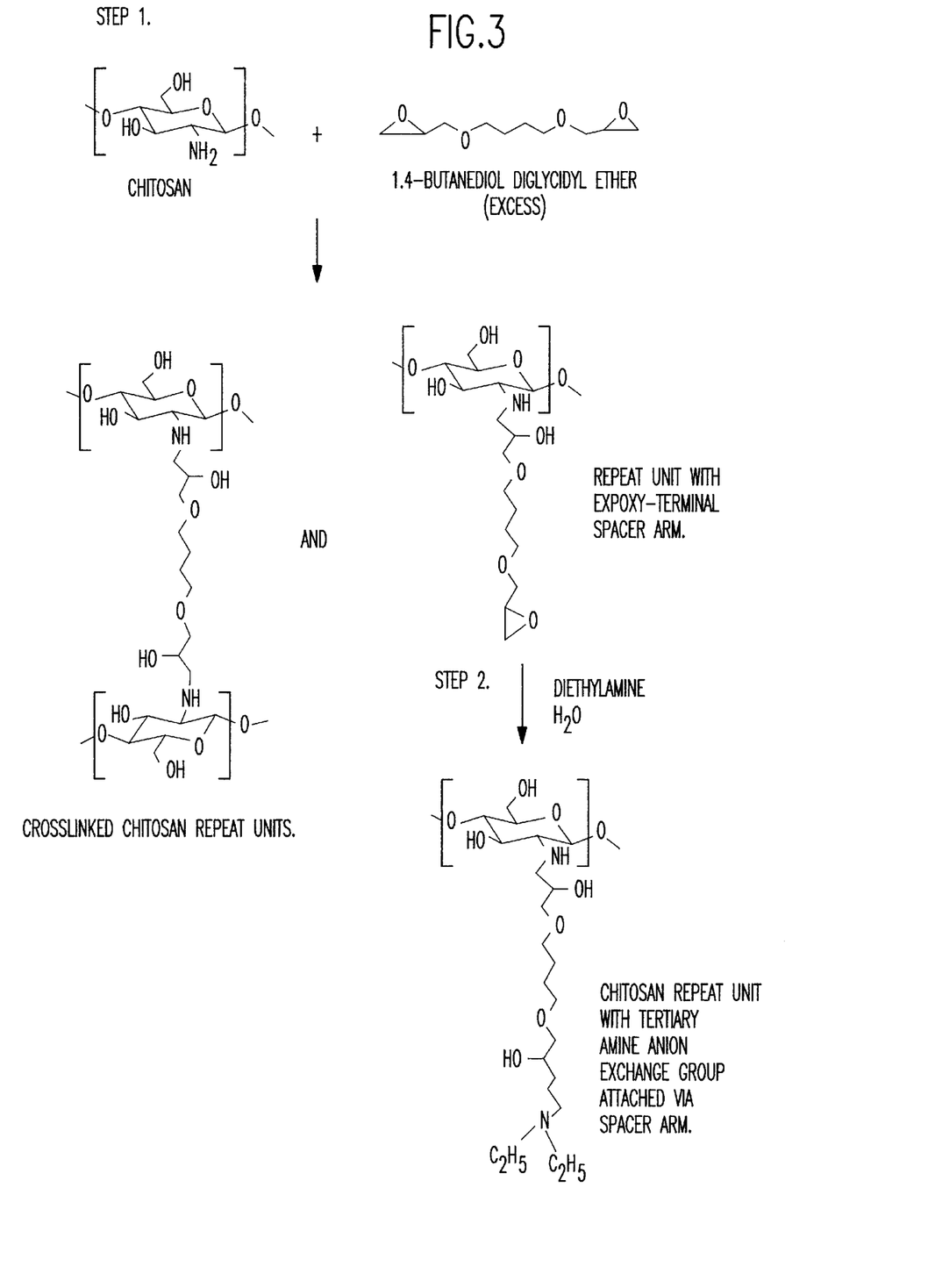
FIG. 3 is a schematic representation of a reaction according to the present invention for simultaneous crosslinking and installation of an epoxy-terminated spacer arm on chitosan, followed by reaction to form a DEA anion exchange group attached to the chitosan molecule via the spacer arm.

As illustrated in FIG. 3, the use of "a large excess", as defined herein, of a polyfunctional epoxide with chitosan in the crosslinking reaction has been discovered to provide reaction products including not only crosslinked chitosan having a chitosan repeat unit attached at each epoxide group, but also a fraction of the polyfunctional epoxide molecules have only one epoxide group reacted with the chitosan repeat unit such that they are left with an epoxide group that is unreacted with chitosan to provide an epoxy-terminated spacer arm. A "large excess" of polyfunctional epoxide used in the reaction to crosslink chitosan generally means a concentration of polyfunctional epoxides in the reaction mixture of about 8% to 99% (% v./v.), more specifically about 8% to about 25% (% v./v.) while the concentration of chitosan solids in the reaction mixture is about 1% to 2% (% w./v.).

The polyfunctional epoxide used in the initial crosslinking and spacer arm installation reaction preferably has terminal epoxide groups to optimize the spacing distance achieved and a main chain segment devoid of groups that would introduce strong hydrophobic character, such as a aromatic groups (e.g., phenyl). Introduction of hydrophobic groups may lead to undesirable binding of proteins by hydrophobic interactions.

Suitable polyfunctional epoxides include, for example, alkanediol diglycidyl ethers, polyether glycol diglycidyl ethers, trifunctional glycidyl ether derivatives of triglycerol, hydantoin epoxy, and cycloaliphatic epoxy. Difunctional epoxides having a pair of terminal epoxide groups and an intervening linear main chain are preferred, such as the alkanediol- or polyetherglycol- diglycidyl ethers, as they form efficient tine-like structures extending from one terminal end attached to the chitosan matrix outward to the unreacted epoxide group remotely located from the matrix at the opposite distal end of the linear chain. The alkanediol diglycidyl ethers, include, for example, unbranched $C_3$ to $C_8$-alkanediols diglycidyl ethers. The polyether glycol diglycidyl ethers include, e.g., polyalkylene glycol (e.g., polyethylene glycol or polypropylene glycol) diglycidyl ethers having a weight average molecular weight ranging from about 200 to 20,000. The spacing distance introduced can be easily tailored through selection of the chain length of the main segment.

The alkanediols diglycidyl ethers can be synthesized by conventional methods, such as by reaction of an alkanediol with epichlorohydrin to obtain a chlorohydrin, and then converting the chlorohydrins to epoxide groups by elimination of HCl under basic conditions. Commercial sources of alkanediol diglycidyl ethers include a Technical Grade diglycidyl ether supplied by Acros organics Co., which contains about 54–60% by volume 1,4,-butanediol diglycidyl ether (BDDGE). Aldrich Chemical Co. also supplies a similar Technical Grade butanediol diglycidyl ether containing 60% by volume 1,4-butanediol diglycidyl ether. Technical Grade diglycidyl ether can be enriched up to a content of about 87%–95% BDDGE by vacuum distillation to remove high boiling impurities. Also, a 70% 1,4,-butanediol diglycidyl ether formulation can be obtained from Sigma Chemical Co. under the trade name ARALDITE RD-2. 95% BDDGE content formulations can be commercially obtained from Aldrich Chemical Co., Sigma Chemical Co, or from Fluka Chemical Co.

Trifunctional glycidyl ethers can be synthesized by reaction of triglycerol with propylene oxide, and reacting the resulting chain-extended triglycerol intermediate product with epichlorohydrin to obtain a chlorohydrin, which can be converted to epoxide groups by elimination of HCl under basic conditions.

Chitosan, as the other starting material used in the crosslinking/spacer arm installation reaction step, is commercially available from a wide variety of sources. For instance, chitosan is commercially available from Vanson Co. of Redmond, Wash., and Fluka Chemical Co. also offers chitosan in three different molecular weight grades. Chitosan is also often graded by viscosity, which is determined by molecular weight. The degree of deacetylation of amino groups is another important parameter which varies among batches. Chitosan amine groups which are not deacetylated, i.e., methylamide groups, cannot participate in amine group reactions, and they also will not form ionic bonds with organic acids such as carboxylic acids. Thus, too low a degree of deacetylation may have a detrimental effect on chitosan solubility in aqueous acids. Not all, but most, amine groups are acetylated in native chitin. The degree of deacetylation and the molecular weight of chitosan both depend on the severity of the hydrolysis treatment of chitin.

It is important that the chitosan has a majority of free, primary amine groups along its polymeric backbone available to form ionic complexes with carboxylic acids, thus lending solubility in aqueous carboxylic acid solutions. These primary amine groups are highly reactive to a wide range of substitution reactions with reagents such as epoxides, acid anhydrides, acid chlorides, alkyl halides, and so forth. The chitosans used in the present invention generally are at least 50% or more deacetylated, and preferably about 80% or more deacetylated. Commercially available chitosans are generally about 80% to 95% deacetylated.

The chitosan starting material can be made by any convenient conventional method, such as by hydrolyzing chitin in a concentrated solution of sodium hydroxide on heating and then recovering chitosan by filtration and water washing. The chitosan starting material is soluble in dilute acids but not soluble in neutral water or alkali. Chitosan is a semicrystalline solid which is more soluble in water having a pH less than 6, than chitin, but chitosan usually requires the use of aqueous organic acids to attain solubility.

Chitosan is a glucose amine polymer. The chemical structure of chitosan primarily has a repeating structural unit that is represented by Formula I as follows:

where n is greater than 3. However, as explained above, some amine groups in chitosan used in this invention may be acetylated. Preferably the chitosan has a weight-average molecular weight ($M_w$) ranging from about $10^4$ to about $10^6$; although the molecular weight may be varied depending on the ultimate use envisaged for the crosslinked chitosan product.

The chitosan starting materials can be porous or nonporous, and have a geometrical shape that can be regular or irregular, depending at least in part on the ultimate usage of the support material envisaged.

For the sake of convenience and illustration, the description herein will occasionally refer to the chitosan support material in the context of beads, although it is to be understood that the invention is not necessarily limited to that configuration.

To prepare the chitosan bead starting material, solid chitosan starting material is dissolved in a weak organic acid, such as 1 to 10 wt. % acetic acid, formic acid, and the like, to provide a chitosan solution. The viscosity of the solution should be in the range of about 1,000 cP to 10,000 cP, preferably about 6,000 cP. The solids content of the chitosan beads varies linearly with the chitosan concentration in solution.

The chitosan hydrogel beads are formed from the chitosan solution by atomizing the solution into droplets which are converted into hydrogel beads by precipitation of the chitosan in aqueous alkali (e.g., 0.1 to 2.0 N sodium hydroxide solution) containing 30% ethanol. The ethanol component is not required, but it allows the beads to sink faster by reducing the density of the alkali solution. The hydrogel beads formed are decanted, filtered, washed and stored in distilled (deionized) water for subsequent treatment.

Although not required, it is preferred that the chitosan bead starting material, in hydrogel form, is solvent-exchanged with a non-aqueous liquid solvent to displace water from the chitosan support material (e.g., beads) and create anhydrous conditions within the support material (e.g., beads) before performing the crosslinking/spacer arm installation step. It is thought that this solvent-exchange procedure increases the free epoxide content of the reacted beads. Suitable non-aqueous solvents for the solvent-exchange procedure, if used, include alcohols (e.g., isopropyl alcohol), acetone, dioxane, chloroform, benzene, tetrahydrofuran (THF), toluene, and xylene. However, it is not required that the crosslinking/spacer arm installation reaction of this invention be carried out in the absence of water. Water conceivably could participate in ring-opening hydrolysis of epoxide groups, which is a reaction catalyzed by strong bases, which could result in loss of terminal epoxide activity on the spacer arms with time. Nonetheless, it is possible to crosslink and install epoxide-terminal spacer arms on chitosan under aqueous conditions, especially if buffer salts are used to regulate the pH, e.g., a pH of 7–9 is desirable for this purpose.

Also, the practice of this invention preferably involves usage of "never-dried" hydrogel beads from chitosan through the course of the inventive method(s). The terminology "never-dried", as used herein, means beads which have the bead and pore size of beads which have not been subjected to water removal (dehydration) or organic solvent removal to leave the beads devoid of liquid solvent, whether aqueous or non-aqueous, at any given time before or during processing to permit drying thereof. Drying of the beads is undesired as it causes shrinkage and thus size reduction in the beads, which effect is not completely reversible upon rehydration or upon combination with a polar organic solvent.

As indicated earlier, when the chitosan starting material and the excess of difunctional epoxides are combined, they interact at some of the primary amines of the chitosan starting material to produce a matrix and other primary amines have the spacer arm installed with one unreacted epoxide group at its terminus. The duration of this crosslinking and spacer arm installation reaction is about 15 to 50 hours, usually about 16 to 24 hours to react all chitosan amine groups. The temperature of the reaction bath depends on the solvent used. In general, the crosslinking/spacer arm installation reaction of the present invention is not significantly effected by adjustments to the reaction temperature insofar as the epoxide activity of the reaction product. Where isopropanol is used, the crosslinking reaction can be performed at room temperature (23° C.), or even at other temperatures such as 70° C., with little observed effect on the epoxide activity achieved in the product. Also, non-nucleophilic solvents, such as THF, can be used. The use of non-nucleophilic solvents, such as THF, have not been observed to strongly influence the epoxide activity achieved in the reaction product. Also, the binding capacity of the inventive hydrogel beads has not been observed to be significantly effected by the column size of the test column.

The epoxide content in the crosslinked chitosan beads formed by this invention generally ranges from about 15 to about 150 $\mu$moles/mL gel. The upper achievable limit for epoxide content is effected greatly by the concentration of the polyfunctional epoxide reactant and the initial solids content of the support material. The higher the solids content of the support material, the higher the epoxide content that is possible. Care must be taken that the higher solid contents do not lead to size-exclusion of large proteins from the gel. It is theorized by the present investigators that the useful upper and lower limits of the epoxide content can be empirically determined with the recognition that a tradeoff will tend to occur between matrix strength and its protein binding capacity, as related to the extent of crosslinking versus retention of unreacted epoxides. Generally speaking, at a lower epoxide content, greater crosslinking can be expected to occur to strengthen the support gel at the expense of binding capacity, while higher epoxide content can be expected to result in increased binding capacity at the expense of strength.

For crosslinked beads (85% deacetylated) with an initial solids content of 3.4%, an epoxide content of 45 $\mu$moles/mL corresponds to about 26% of chitosan amine groups bearing an epoxide group, while an epoxide content of 55 $\mu$moles/mL gel is equivalent to 32% of chitosan amine groups bearing an epoxide group.

Crosslinked chitosan bead products of the inventive method, generally have a solids content, by weight, ranging from about 1.0% to about 10.0%, and more typically between 1 to 5%, with the remainder being constituted by solvent. As saturated with water or non-aqueous solvent, it is preferred that crosslinked beads, either with or without the functionalizations (e.g., anion exchange group formation), have an average particle diameter size between about 10 $\mu$m and about 2000 $\mu$m, and preferably between about 500 to about 2000 $\mu$m.

After crosslinking and installation of the spacer arm, the crosslinked chitosan hydrogel preferably is stored in a non-aqueous medium, if the beads must be stored for a period of time before the unreacted epoxide groups on the spacer arms are functionalized, and the non-aqueous solvent recovered. A slow hydrolysis reaction of epoxide groups will occur with time if the crosslinked beads are stored in water, with the rate being a function of pH and storage temperature.

The progress and extent of the crosslinking reaction of the present invention can be monitored by monitoring the concentration of polyfunctional epoxide in the reaction mixture, such as by gas chromatography, and by titrimetric determination of epoxide content in the beads.

After completion of the crosslinking and spacer installation reaction, the epoxy-terminated spacer arms can then have their unreacted epoxides converted into various types of active sites, such as ion exchange groups, via reaction with appropriate reagents. For example, as illustrated in FIG. 3, these unreacted epoxide groups on the installed spacer arms can be reacted with diethylamine to convert the epoxide groups to diethylamino (DEA) groups. This reaction of the epoxide groups with diethylamine is thought to be quantitative. A 98% purity formulation of diethylamine (DEA) is available from Aldrich Chemical Co.; and a 99+% purity formulation of DEA is available from Acros Organics Co. This activation step is conducted at room temperature for a duration of about 16 to 24 hours in a solvent that can be water or an organic solvent. The activated crosslinked chitosan bead product is drained and washed with deionized water to provide a product ready for use as a support material for bioseparations and chromatographic support applications. The crosslinked and spacer arm installed chitosan product generally retains the integrity of its "pre-shape".

One preferred type of hydrogel material that can be synthesized from chitosan for this invention is represented by the following General Formula II:

where Q is a bivalent linking group, $R_1$ and $R_2$ can be the same or different and each preferably is a $C_1$ to $C_5$ alkyl group, and n is greater than 3. Q preferably is a hydrophilic group because a hydrophobic group could cause undesirable hydrophobic interactions with proteins and similar solutes. Thus, a relatively short alkylene group is useful as Q, such as a $C_3$ to $C_8$ alkylene group, which preferably is an unbranched chain such as derived from the aliphatic main chain segment of an alkanediol. Longer alkylene chains for Q may be possible by hydroxyl functionalization of the segment to counter hydrophobicity. Alternatively, Q can be derived from polyalkyleneglycol compounds, e.g., polyethylene-or polypropylene glycols, of relatively short or long chain length because the ether group linkages regularly interposed in the main chain will tend to counter hydrophobicity of the longer carbon chain lengths.

When adapted to porous chitosan beads, the present invention results in separation products, such as chromatographic support materials, endowed with greatly engineered binding specificity and strength characteristics. The crosslinked chitosan bead products of this invention afford excellent intra-particle transport in separations, and the level and type of derivatization of the crosslinked beads can be tailored to enhance the separation procedure envisaged. Regular bead shapes (e.g., spherical shapes) are preferred in many but not necessarily all applications. The invention is applicable to chitosan support materials of various geometrical shapes, including bead, fiber, and film shapes.

The activated, crosslinked chitosan materials formed by the inventive methods can be effectively used in chromatographic applications and bioseparations. The activated crosslinked chitosan hydrogel of this invention can be used for chromatographic media such as a weak or a strong anion exchange support, a weak or strong cation exchange support, a size exclusion support, a hydrophobic support, or as a metal chelate support. The activated crosslinked chitosan hydrogel of this invention also can used for affinity chromatography media such as an amino support, a carboxy support, or as an aldehyde support.

The crosslinked and functionalized beads of this invention can be used in methods of capturing a solute from an unclarified process feed stream (liquor) using bead chromatography media per this invention in packed bed columns. To accomplish this, a chromatography column is packed, e.g., by gravity or pressure packing, with bead capture chromatography medium constituted by the crosslinked/spacer arm installed chitosan bead materials of this invention. The spacer arms are functionalized at the free terminal ends, for example, to provide a functional group such as an ion exchange group (e.g., DEA-) or a bioaffinity group. The process liquor is applied to the column such that a solute can be adsorbed onto the capture chromatography medium and unclarified process liquor exits said column. To remove entrapped, nonadsorbed particles from said column, the chromatography medium is washed such as by use of high speed wash pulses with occasional changing of direction of the flow on the column. Elution is then typically performed by changing binding conditions so that the captured solute is removed from the capture chromatograhy medium. This is generally performed by changing the pH and/or ionic strength of the solution in contact with the column so that the interactions that caused the product to bind to the column are neutralized. For example, in the case of an anion exchanger, if the pH is lowered, negatively charged groups on the product become protonated and the product dissociates from the column. The eluted solute can be further purified with conventional small beads if desired. The type of solutes that can be captured with inventive medium are not particularly limited, and include proteins, enzymes, cells, cell fragments, lipids, nucleic acids, and antibodies. The chromatography medium also can be used to separate a mixture of at least two different types of solutes by selectively adsorbing one type of solute relative to at least one second type of solute.

Importantly, the steric effects of the installed spacer arms having active (binding) sites spaced away from the matrix backbone endows the crosslinked chitosan with superior binding selectivity which can be exploited for efficient separation of solutes from one another, as is demonstrated in the studies summarized in the Examples herein.

This invention will now be understood more readily with reference to the following examples. However, these examples are intended merely to illustrate the invention and are not to be construed as limiting the scope of the invention. In the examples, all weights, percentages, and amounts therein are by weight unless indicated otherwise.

EXAMPLES

Preparation of Chitosan Starting Material

For purposes of the following examples, chitosan starting material was prepared as follows. Chitosan flakes were dissolved in 1 to 5 wt. % acetic acid to provide a chitosan concentration between 0.5 to 5 wt. % by stirring at room temperature. The dissolved chitosan was centrifuged to remove extraneous matter. The solution of chitosan was atomized into a 0.1 to 2 N aqueous sodium hydroxide solution to form chitosan hydrogels in bead form. The chitosan beads were removed from the sodium hydroxide solution by decantation and filtration. The beads were washed with distilled water in a glass column by standing in water for 30 minutes and then replacing with fresh distilled water several times to obtain chitosan beads at a neutral pH. The beads were kept in water and stored in a closed container. The solids content of the beads were between 1 and 5 wt. % as determined by lyophilization and thermogravimetric analysis (TGA), and the nominal diameter of the beads was 800 μm, unless indicated otherwise in the following examples.

Example 1

An aqueous suspension of chitosan beads prepared from the Preparation Procedure for Chitosan Starting Material was drained of excess water by vacuum filtration. 300 g of the moist chitosan beads, having a solids content of approximately 3.3 wt. % after draining the excess water, was weighed out. The gel volume of the beads was assumed to be the same as the weight of the drained beads; that is, it is an approximation that all excess water is removed from the outside of the beads by vacuum filtration, and what is left is the water inside the beads plus the bead solids (i.e., chitosan). Since the starting chitosan beads are about 97% water content in these examples, the density of the beads can be assumed to be equal to 1.0, and therefore the bead volume is equal to the drained bead weight.

The beads were solvent exchanged by pouring 100% ethanol on the drained beads until the beads were immersed and covered with ethanol and the beads could be freely stirred in the ethanol. The ethanol was 100% absolute, nondenatured ethanol obtained from Paper Alcohol & Chemical Co., Shelbyville, Ky. The beads were stirred and allowed to soak for 2–5 minutes, then the beads were vacuum filtered to drain away excess solvent. This solvent-exchange procedure was repeated for a total of three exchanges using 350 mL of 100% ethanol, followed by three exchanges with 300 mL (each time) of 100% isopropanol. The beads were drained a final time and then transferred to a reaction flask.

Technical Grade diglycidyl ether was obtained from Aldrich Chemical Co., and it contained 60% by volume 1,4-butanediol diglycidyl ether with the balance being represented by impurities. The amount of diglycidyl ether needed to give a 10:1 molar ratio of epoxide groups to amine groups was calculated based on using 300 g of drained weight chitosan beads (solvent-exchanged to isopropanol). This amount of diglycidyl ether corresponded to providing approximately 8% by volume amount of the Technical Grade diglycidyl ether in the reaction mixture. 80 mL of Technical Grade diglycidyl ether was poured into the reaction flask and then 300 mL of additional isopropanol was added with stirring. The isopropanol was obtained from AR Mallinckrodt Co. The reaction mixture was constantly stirred with a blade stirrer for about 24 hours at room temperature (about 23° C.).

The crosslinked chitosan beads obtained were drained and washed three times with isopropanol (400 mL each wash). The beads were then washed three times with deionized water with stirring (400 mL each wash). These beads were then stored in water in a refrigerator (4° C.) until the next day when subjected to a DEA-functionalization reaction described below.

The solids content of the crosslinked chitosan was 3.9 wt. % as determined by TGA. A small sample of the crosslinked beads was removed for an epoxide content determination. The epoxide activity of the crosslinked chitosan beads was 25 $\mu$moles/mL gel. The epoxide activity was determined by titration with sodium thiosulfate, which releases NaOH as it reacts with epoxide groups, with the pH kept constant at 7.0 by addition of HCl. The epoxide content was determined from the amount of HCl used to maintain neutral pH. The crosslinked beads were insoluble in dilute acetic acid, neutral pH water, and sodium hydroxide solutions.

The next step was the conversion of the unreacted terminal epoxide groups of the installed spacer arms on the crosslinked chitosan to DEA groups. To accomplish this, the beads washed with water were first drained and transferred to a reaction vessel. If the crosslinked beads had been stored in isopropanol, the stored beads would be solvent-exchanged to water by washing three times with distilled water with stirring, and then drained and transferred to the reaction vessel.

Next, a volume of diethylamine (98% purity obtained from Aldrich Chemical Co.) was measured out that was equal to the gel volume and the resulting mixture was diluted with two gel volumes of water. That is, for every 100 g drained weight of beads, 100 mL of diethylamine was pre-mixed with 200 mL of dilution water. The diethylamine/water mixture was then poured on the previously crosslinked beads and stirred at room temperature (about 23° C.) overnight (about 16 hours) using a floating magnetic stir bar for stirring. The beads were then transferred to a wash column, where the beads were drained and washed three-four times with deionized water, and then once with 0.1 M HCl, then six-eight times with deionized water. The water was drained to recover DEA-activated, crosslinked chitosan product.

Example 2

Chitosan beads were prepared and solvent-exchanged in the same manner as Example 1. Then, the crosslinking and spacer arm installation reaction was conducted in the same manner as Example 1 except that: (a) the Technical Grade diglycidyl ether was premixed with the isopropanol in a separate container before addition together to the reaction flask containing the chitosan beads for the crosslinking/spacer arm installation reaction, and (b) the reaction mixture contained 25% by volume Technical Grade diglycidyl ether (60 vol. % 1,4-butanediol diglycidyl ether). That is, for every 500 g of drained beads, 250 mL of Technical Grade diglycidyl ether and 250 mL of isopropanol were used in the reaction system for crosslinking/spacer arm installation.

This 25% Technical Grade digylcidyl ether/isopropanol/bead system was reacted with the chitosan beads under the same reaction time and temperature conditions as Example 1. The epoxide activity of the crosslinked chitosan beads was determined to be 40–45 $\mu$moles/mL gel. The unreacted terminal epoxide groups of the installed spacer arms on the crosslinked chitosan were converted to DEA groups in the same manner as Example 1.

Example 3

Chitosan beads were prepared and solvent-exchanged in the same manner as Example 1 except that the starting chitosan beads were 500 $\mu$m nominal diameter beads. The crosslinking/spacer arm installation reaction conditions of Example 2 were then repeated except that this reaction was conducted instead at 70° C. by heating the reaction flask. The epoxide activity of the crosslinked chitosan beads was determined to be 40–45 $\mu$moles/mL gel. The unreacted terminal epoxide groups of the installed spacer arms on the crosslinked chitosan were converted to DEA groups in the same manner as in Example 1.

Example 4

Chitosan beads were prepared and solvent-exchanged in the same manner as Example 1. Then, the crosslinking and spacer arm installation reaction was conducted in the same manner as Example 1 except that the reaction mixture contained 50% by volume Technical Grade diglycidyl ether (60 vol. % 1,4-butanediol diglycidyl ether) obtained by mixing 200 g of drained beads (solvent exchanged to isopropanol) with 200 mL of Technical Grade diglycidyl ether (no additional isopropanol was used).

This reaction system containing 50% Technical Grade digylcidyl ether was reacted with the chitosan beads under the same reaction conditions as Example 1. The epoxide activity of the crosslinked chitosan beads was determined to be 41 μmoles/mL gel. The unreacted terminal epoxide groups of the installed spacer arms on the crosslinked chitosan were then converted to DEA groups in the same manner as Example 1.

Example 5

Chitosan beads were prepared and solvent-exchanged in the same manner as Example 1. A formulation containing 95% by volume 1,4,-butanediol diglycidyl ether was obtained from Aldrich Chemical Co. and blended with isopropanol and solvent-exchanged chitosan beads to form a reaction mixture containing 25% by volume of the high purity diglycidyl ether formulation. That is, for every 500 g of drained beads, 250 mL of the high purity diglycidyl ether formulation and 250 mL of isopropanol were used in the reaction system.

This particular diglycidyl ether/isopropanol/bead system was reacted with the chitosan beads under the same mixing protocol, and reaction time and temperature conditions as Example 2. The epoxide activity of the crosslinked chitosan bead product was determined to be 55 μmoles/mL gel. The unreacted terminal epoxide groups of the installed spacer arms on the crosslinked chitosan were converted to DEA groups in the same manner as Example 1.

Example 6

Chitosan beads were prepared and solvent-exchanged in the same manner as Example 1. Then, the crosslinking and spacer arm installation reaction was conducted using 125 mL of Technical Grade diglycidyl ether (60 vol. % 1,4-butanediol diglycidyl ether) premixed in 250 mL tetrahydrofuran (THF) which was then reacted with 500 g of drained beads by heating at 40° C. overnight for about 16 hours in a reaction flask.

The epoxide activity of the crosslinked chitosan beads was determined to be 40 μmoles/mL gel. The unreacted terminal epoxide groups of the installed spacer arms on the crosslinked chitosan were converted to DEA groups in the same manner as Example 1.

Comparative Example 1

For comparison, a separate sample of the chitosan beads was first prepared and solvent-exchanged in the same manner as Example 1.

A reaction mixture containing 2.5% by volume Technical Grade 1,4-butanediol diglycidyl ether was prepared by combining 1300 g of drained chitosan beads (3.3% solids by TGA) with 70 mL of Technical Grade diglycidyl ether (60 vol. % 1,4-butanediol diglycidyl ether) and 1500 mL water in a reaction vessel. This reaction mixture was stirred for 22 hours at 80° C. The beads were subsequently washed several times with water, then reacted overnight (about 16 hours) with 500 mL propylene oxide plus one liter of water at room temperature to react any remaining primary amine groups.

Diethylaminoethyl (DEAE) groups were then installed according to the following protocol by reaction of DEAE-Cl with chitosan hydroxyl groups under strongly alkaline conditions. More specifically, after crosslinking with diglycidyl ether and reaction with propylene oxide, as described above, the beads were vacuum filtered to drain excess water. 500 g of the drained chitosan beads were solvent exchanged with twice with THF (500 mL each). The THF-exchanged beads were transferred to a reaction flask with 500 mL additional THF. 125 g of DEAE-Cl-hydrochloride, obtained from Acros Organics, as an approximate ratio of five moles DEAE-Cl·HCl per mole of chitosan repeat units, was added to the flask and stirred for 30 minutes, dissolving the DEAE-Cl in the THF. Then, 30 g NaOH dissolved in 150 mL water was added dropwise to the reaction mixture. The mixture was stirred at room temperature for eight hours and then refluxed for eight hours (THF boiling point is ~66° C.). The beads were then filtered and washed thoroughly with water.

Comparative Example 2:

Functionalized (quaternized) chitosan beads were prepared as follows for comparison purposes. The same bead preparation and solvent-exchange procedures as in Example 1 were used. 1000 g of drained chitosan beads were then transferred to a reaction flask with addition of about two additional liters of isopropanol.

5.6 g of glycidyl trimethylammonium chloride, 90% purity from Aldrich Chemical), was added to the reaction flask with stirring. The mixture was refluxed for eight hours. Then, another 5.6 g of glycidyl trimethylammonium chloride was added, and reflux was continued for an additional eight hours. Another 2.8 g glycidyl trimethylammonium chloride was added and refluxed for another eight hours. This protocol provided a total 0.6:1 ratio of glycidyl trimethylammonium chloride:chitosan amine groups and a total reflux of 24 hours.

Next, 15.2 mL of Technical Grade diglycidyl ether (60 vol. % 1,4-butanediol diglycidyl ether) was added to the reaction flask and reflux was continued for three hours. After three hours, an additional 15.2 mL Technical Grade diglycidyl ether was added and the reflux continued for 13 hours.

The overall stoichiometry of these reaction steps was 0.60 moles diglycidyl ether/mole chitosan amine (i.e., 1.2 moles epoxide/mole chitosan amine). The bead product was washed several times with isopropanol, then several times with deionized water.

Example 7

Salt elution studies were conducted to compare the binding capacity and binding selectivities of DEA-activated (with spacer), crosslinked chitosan bead products made according to Example 1, designated beads "B1", versus DEAE-activated (without spacer), crosslinked chitosan bead products made according to Comparative Example 1, designated beads "CB1".

As to the protocol of these studies, a 1.5 cm diameter×13 cm bed height column (bed volume 20 ml) was used for the elution experiments. The load/wash buffer was 20 mM potassium phosphate dibasic at a pH of 7.5. A protein (solute) of 100 mg bovine serum albumin (BSA) was diluted to a final BSA concentration of 2.0 mg BSA/ml solution. The solution was thoroughly mixed with shaking in a volumetric flask. The BSA solution was commercial obtained as a BSA Fraction V, fractionation by cold alcohol precipitation, supplied by Sigma Chemical, Catalog No. A-2153.

20 mL bed volumes of each type of bead were packed into the column and tested in a series of different elution buffers based on 20 mM potassium phosphate dibasic at a pH of 7.5 combined with 25 mM to 200 mM of 1.0 M NaCl, in the increments indicated in Table 1. The load/wash flow rate was 5.0 mL/min and the elution flow rate was 10.0 ml/min.

The starting BSA concentration in the solution before elution in the column was determined by taking a $A_{280}$ reading value using a Shimadzu UV spectrophotometer at 280 nm. To accomplish this, a 1 mL sample of BSA solution was carefully pipetted off the thoroughly mixed BSA solution before its introduction to the column, and this liquid was transferred to a quartz curvette. A set of curvette was previously zeroed the UV spectrophotometer with the 20 mM phosphate buffer alone without BSA prior to the experiment. A concentration function available on the spectrophotometer was used to calculate the BSA concentration from the UV absorbance. That is, the concentration of BSA was determined using a calibration curve generated from known BSA solutions of known concentrations.

The BSA solutions were run through the column at the flow rates described above. The elution absorption of the BSA solutions were taken after elution in the column and compared to the initial BSA reading. The BSA sorption in the beads was determined on a percentage basis as calculated from the difference in the $A_{280}$ reading values for each of the BSA eluted salt concentration solutions from the starting (initial) reading.

The overall test results are summarized in Table 1 below.

TABLE 1

| Bead Type | Activation protocol (FIG.) | Ft/ Wash | BSA Eluted at Salt Concentration (% of Load) | | | | | |
|---|---|---|---|---|---|---|---|---|
| | | | 25 mM | 50 mM | 75 mM | 100 mM | 200 mM | 1.0M |
| CB1 | 1 | 21 | 7 | 22 | 17 | 15 | 20 | 2 |
| B1 | 3 | 38 | 21 | 17 | 5 | 3 | 3 | 2 |

The results of Table 1 show that the comparative ion exchanger beads CB1 made according to Comparative example 1 exhibited high binding capacity for the test protein, BSA (bovine albumin serum); however, the results also revealed that the BSA partially eluted over a relatively broad range of salt concentrations from 25 mM to 200 mM. This broad elution behavior suggested to the present investigators that a wide range of binding energies existed between the protein molecules and the ion exchange groups on the crosslinked chitosan beads lacking a spacer arm for the activated sites. While not desiring to be bound to any particular theory at this time, it is the present investigators' theory that, due to multipoint attachment, this behavior is attributable to some of the ion exchange groups having less of an affinity to protein molecules.

The present inventors significantly reduced the amount of non-selective binding by installing a spacer arm between the chitosan matrix and terminal anion exchange group, as demonstrated by the results achieved for the beads B1 made according to Example 1 of this invention. Namely, the beads B1 of the present invention demonstrated markedly improved selectivity of binding, as most of the BSA eluted in the 25 mM to 50 mM NaCl concentration range.

Example 8

PH elution studies for two different proteins, viz. BSA and IgG, were separately conducted to compare the binding capacity and binding selectivities of DEA-activated (with spacer), crosslinked chitosan bead products made according to Example 1, designated beads "B2", versus DEAE-activated (without spacer), crosslinked chitosan bead products made according to Comparative Example 1, designated beads "CB2".

As to the protocol of these studies, a 1.5 cm diameter×13 cm bed height column (bed volume 20 ml) was used for this experiment. The load/wash buffer was 20 mM potassium phosphate dibasic at a pH of 7.5. One tested protein (solute) was 40 mg bovine serum albumin (BSA) solution diluted to a final BSA concentration of 2 mg BSA/ml solution (total volume: 80 mL). The solution was thoroughly mixed with shaking in a volumetric flask. The BSA solution was commercially obtained as a BSA Fraction V, fractionation by cold alcohol precipitation, Sigma Cat. No. A-2153. A second separately tested protein for each type of bead was 40 mg IgG diluted to a final concentration of 2 mg IgG/ml solution (total volume: 80 mL). The solution was thoroughly mixed with shaking in a volumetric flask. The IgG, Bovine from Cohn, Fraction II and III, was supplied by Sigma Chemical, Catalog No. G-500R.

20 mL bed volumes of the tested beads were packed into the column and tested in a series of different elution buffers based on 20 mM potassium phosphate dibasic at a series of different pH values varying from 7.5 to 3.3. Elution buffers tested were: 20 mM phosphate, pH=7.5; 20 mM phosphate, pH=6.5; 20 mM phosphate, pH=5.5; 20 mM acetate, pH=4.5; 0.1 M acetate, pH=3.3. The load/wash flow rate was 5.0 mL/min and the elution flow rate was 10.0 ml/min.

The starting BSA or IgG concentration in the respective solutions before elution in the column was determined by taking a $A_{280}$ reading value using a Shimadzu UV spectrophotometer at 280 nm. The procedure for this was as follows: 1 mL sample of BSA solution, or IgG solution, as applicable, was carefully pipetted off the thoroughly mixed protein solution of interest before its introduction to the column, and this liquid was transferred to a quart curvette. A set of curvettes was previously zeroed in the UV spectrophotometer with the 20 mM phosphate buffer alone without protein prior to the experiment. A concentration function available on the spectrophotometer was used to calculate the protein concentration from the UV absorbance. That is, the concentration of protein was determined using a calibration curve generated from known BSA solutions, or IgG solutions, as applicable, of known concentrations.

The respective protein solutions were run through the column at the flow rates described above. The flow through and elution $A_{280}$ absorption of the respective protein solutions were taken after elution in the column and compared to the initial readings for the protein of interest.

The protein sorption in the beads was determined on a percentage basis as calculated from the difference in the $A_{280}$ reading values in the final protein solution concentration from the starting (initial) reading.

The overall test results are summarized in Table 2 below. Several entries, indicated "NA", indicate that no data point was taken at that condition.

TABLE 2

| Bead Type | Activation protocol (FIG.) | Protein | Protein Eluted (% of Load) | | | | | |
|---|---|---|---|---|---|---|---|---|
| | | | Load/ Wash pH 7.5 | pH 6.5 | pH 5.5 | pH 4.5 | pH 3.3 | 1M NaCl |
| CB2 | 1 | BSA | 8.6 | 13.9 | 8.2 | 69.4 | 10.6 | 15.2 |
| B2 | 3 | BSA | 27.7 | 7.0 | 0 | 0 | 51.4 | 0 |
| CB2 | 1 | IgG | 55.2 | 6.1 | NA | 7.5 | 1.3 | 0 |
| B2 | 3 | IgG | 76.9 | 3.4 | NA | 7.5 | 1.3 | 0 |

The results of Table 2 show that the comparative ion exchanger beads CB2 made according to Comparative example 1 exhibited high binding capacity for the test protein, BSA (bovine albumin serum) as shown in the load/wash effluent. However, the results also revealed that the BSA eluted at every pH with comparative beads CB2 indicating that the non-selectivity of binding caused dedifferentiation at the various pH levels. By contrast, the inventive beads B2 showed high selectivity with the majority of BSA eluting at pH 3.3.

Also, when using inventive beads B2, 77% of the IgG applied came out in the load/wash effluent, with very little elution at the various pH levels. In contrast, in the case of the comparative beads CB2, only 55% of the IgG came out in the load/wash effluent, with the rest eluting predominantly at pH 4.5, the same pH at which a majority of the BSA eluted. This indicates a problem for any attempted use of the comparative beads CB2 to separate BSA, from IgG. On the other hand, the results show the spacer arm provided in the inventive beads were effective in reducing the amount of non-selective binding.

Example 9

An experiment was conducted to study the binding selectivity of DEA-activated (with spacer), crosslinked chitosan bead products made according to Example 1 in the separation of a mixture of protein solutes.

A small scale column was used that was 1.5 cm diameter× 13 cm in height (20 mL bed volume). The column was packed with 20 mL bed volume of DEA-activated (with spacer), crosslinked beads made according to Example 1. The load buffer was 20 mM phosphate at a pH of 7.5. The elution buffer was 0.1 M acetate at a pH of 3.3. The load flow rate was 5 mL/min (2.9 cm/min), and the elution flow rate was 10 mL/min (5.9 cm/min). The protein load was 20 mg BSA at in a 2 mg/mL concentration solution and 20 mg IgG in a 2 mg/mL concentration solution.

The BSA concentration, and IgG concentration, respectively, was separately determined from the respective protein source solutions using a Shimadzu UV spectrophotometer at 280 nm to take $A_{280}$ readings before their mixture and before elution in the column. The procedure for this was as follows: a 1 mL sample of respective protein solution was carefully pipetted off the thoroughly mixed protein solution of interest before its mixture with the other protein solution and introduction to the column, and this liquid is transferred to a quartz curvette. A set of curvettes was previously zeroed in the UV spectrophotometer with the 20 mM phosphate buffer alone without protein prior to the experiment. A concentration function available on the spectrophotometer was used to calculate the protein concentration from the UV absorbance. That is, the concentration of protein was determined using a calibration curve generated from known BSA solutions, or IgG solutions, as applicable, of known concentrations.

The two protein solutions were then mixed together and run through the column at the flow and elution rates described above. The flow through and elution absorption $A_{280}$ readings of the mixture were taken and compared to the initial BSA and IgG readings. From this, it was extrapolated that the total IgG load was 89% of the flow through $A_{280}$, and the elution $A_{280}$ was 93% of the BSA load, as based on protein calculations summarized below.

The BSA binding capacity was 38 mg (see Example 7) and the BSA load was 20 mg (approximately ½ maximum binding capacity). The $A_{280}$ reading value for 20 mg of BSA was 11.8 OD before elution and the BSA/IgG Elution $A_{280}$ reading value was 10.55 OD. The (Elution value/(BSA Load) ratio value was 89%.

The IgG load was 20 mg based on an assumption of complete flowthrough. The BSA/IgG $A_{280}$ Flow through reading value was 18.8 OD. The (IgG Load)/(Flow through Value) ratio value was 93%.

These results demonstrated that the binding selectivity of DEA-activated (with spacer), crosslinked chitosan bead products made according to this invention can be effectively used in the separation of a mixture of protein solutes, such as BSA and IgG.

While the invention has been described in terms of its preferred embodiments, those skilled in the art will recognize that the invention can be practiced with modification within the spirit and scope of the appended claims.

What is claimed is:

1. A method for making a crosslinked chitosan having spacer arms presenting activation sites at distal ends thereof, comprising the step of combining chitosan material having unreacted primary amine groups with an excess amount of a polyfunctional epoxide compound having at least two epoxide groups effective to crosslink said chitosan material to form a crosslinked chitosan support material and install spacer arms on said chitosan support material wherein said spacer arms have an unreacted terminal epoxide group at a distal end of said spacer arm.

2. The method of claim 1, wherein said polyfunctional epoxide is combined with said chitosan material in an amount effective to provide about 5 or more moles of epoxide groups for every one mole of said amine groups.

3. The method of claim 1, wherein said polyfunctional epoxide is combined with said chitosan material in an amount effective to provide about 5 to about 75 moles of epoxide groups for every one mole of said amine groups.

4. The method of claim 1, wherein said polyfunctional epoxide compound and said chitosan material are combined in a reaction mixture for said crosslinking and spacer arm installation in amounts of about 8% to 99% (% v./v.) polyfunctional epoxide and about 1% to about 2% (% w./v.) chitosan.

5. The method of claim 1, further comprising the step of activating said unreacted terminal epoxide groups on said spacer arms.

6. The method of claim 5, wherein said activation step comprises reacting said crosslinked chitosan support material with a dialkylamine to form tertiary amine anion exchange groups each attached to said crosslinked chitosan support material via one of said spacer arms.

7. The method of claim 1, wherein said polyfunctional epoxide is selected from the group consisting of alkanediol diglycidyl ethers, polyalkylenediol diglycidyl ethers, trifunctional glycidyl ether derivatives of triglycerol, hydantoin epoxy, and cycloaliphatic epoxy.

8. The method of claim 1, wherein said polyfunctional epoxide is a difunctional epoxide.

9. The method of claim 1, wherein said polyfunctional epoxide is selected from alkanediol diglycidyl ethers or polyalkyleneglycol diglycidyl ethers.

10. The method of claim 1, wherein said crosslinked chitosan support material has an epoxide content ranging from about 15 to about 150 $\mu$moles/mL gel.

11. The method of claim 1, wherein said crosslinked chitosan support material has a shape selected from the group consisting of beads, films, and fibers.

12. The method of claim 1, wherein said crosslinked chitosan support material comprises beads.

13. The method of claim 1, wherein said crosslinked chitosan support material comprises spherical beads.

14. The method of claim 1, wherein said crosslinked chitosan support material comprises an exterior surface and an internal surface, wherein said amine groups on said chitosan material are reacted with epoxide groups of said polyfunctional epoxide during said combining step at locations both on said internal surface and on said exterior surface.

15. The method of claim 1, wherein said chitosan material is provided as swollen with a non-aqueous organic fluid or an aqueous fluid.

16. The method of claim 1, wherein said chitosan material is provided as swollen with a non-aqueous organic fluid selected from the group consisting of isopropanol, acetone, chloroform, tetrahydrofuran, dioxane, benzene, toluene, and xylene.

17. The method of claim 1, wherein said chitosan material is swollen with an aqueous fluid, and further comprising solvent-exchanging said chitosan material swollen with an aqueous fluid into a non-aqueous environment prior to crosslinking.

18. The method of claim 1, wherein said crosslinked chitosan support material is in the form of beads having about 1 to about 10 wt. % solids and having an average particle diameter size of about 10 μm or larger.

19. The method of claim 1, wherein said crosslinked chitosan support material are beads having 1 to 10 wt. % solids and having an average particle diameter size ranging from about 10 μm to about 2000 μm.

20. The crosslinked chitosan support material product of the method of claim 1.

21. The crosslinked chitosan support material product of the method of claim 2.

22. The crosslinked chitosan support material product of the method of claim 4.

23. The crosslinked chitosan support material product of the method of claim 6.

24. The crosslinked chitosan support material of the method of claim 12.

25. A crosslinked hydrogel material from chitosan comprising General Formula II:

where Q is a bivalent linking group, $R_1$ and $R_2$ can be the same or different and each is a $C_1$ to $C_5$ alkyl group, and n is a positive integer greater than 3.

26. The crosslinked hydrogel material of claim 25, wherein Q is an alkylene group or a poly(oxyalkylene) group.

27. A method of capturing a solute from a process liquor using a bead chromatography medium in a packed bed column, comprising the steps of:

providing a chromatography column packed with a bead capture chromatography medium, wherein said capture chromatography medium comprises a crosslinked hydrogel material from chitosan comprising General Formula II:

where Q is a bivalent linking group, $R_1$ and $R_2$ can be the same or different and each is a $C_1$ to $C_5$ alkyl group, and n is a positive integer greater than 3;

flowing said process liquor through said column wherein said solute adsorbs to said capture chromatography medium and unclarified process liquor exits said column;

removing entrapped, nonadsorbed particles from said column by washing said capture chromatography medium; and eluting product from said capture chromatography medium by changing binding conditions so that the adsorbed solute is removed from the column.

28. The method of claim 27, wherein said solute is selected from the group consisting of proteins, enzymes, cells, cell fragments, lipids, nucleic acids, and antibodies.

29. The method of claim 27, further comprising using said capture chromatography medium to separate a mixture of at least two different types of solutes by selectivity adsorbing one type of solute relative to at least one second type of solute.

30. The method of claim 27, wherein said active terminal groups at said distal ends of each said spacer arm are functional groups selected from the group consisting of ion exchange groups, bioaffinity groups, hydrophobic groups, size exclusion groups, and metal chelating groups.

* * * * *

UNITED STATES PATENT AND TRADEMARK OFFICE
CERTIFICATE OF CORRECTION

PATENT NO. : 5,770,712      Page 1 of 3
DATED : June 23, 1998
INVENTOR(S) : Swapan K. Roy, Jason G. Todd, Wolfgang G. Glasser

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,770,712
DATED : June 23, 1998
INVENTOR(S) : Swapan K. Roy, Jason G. Todd, Wolfgang G. Glasser

It is certified that error appears in the above-identified patent and that said Letters Patent is hereby corrected as shown below:

UNITED STATES PATENT AND TRADEMARK OFFICE
CERTIFICATE OF CORRECTION

PATENT NO. : 5,770,712
DATED : June 23, 1998
INVENTOR(S) : Swapan K. Roy, Jason G. Todd, Wolfgang G. Glasser It is certified that error appears in the above-identified patent and that said Letters Patent is hereby corrected as shown below:

Signed and Sealed this

Eighth Day of June, 1999

Attest:

Q. TODD DICKINSON

Attesting Officer

Acting Commissioner of Patents and Trademarks